United States Patent
Diehl et al.

(10) Patent No.: US 11,910,163 B2
(45) Date of Patent: Feb. 20, 2024

(54) SIGNAL PROCESSING DEVICE, SYSTEM AND METHOD FOR PROCESSING AUDIO SIGNALS

(71) Applicant: Sonova AG, Staefa (CH)

(72) Inventors: Peter Udo Diehl, Berlin (DE); Elias Sprengel, Berlin (DE)

(73) Assignee: Sonova AG, Staefa (CH)

( * ) Notice: Subject to any disclaimer, the term of this patent is extended or adjusted under 35 U.S.C. 154(b) by 403 days.

(21) Appl. No.: 17/425,248

(22) PCT Filed: Jan. 24, 2020

(86) PCT No.: PCT/EP2020/051734
§ 371 (c)(1),
(2) Date: Jul. 22, 2021

(87) PCT Pub. No.: WO2020/152323
PCT Pub. Date: Jul. 30, 2020

(65) Prior Publication Data
US 2022/0095061 A1    Mar. 24, 2022

(30) Foreign Application Priority Data

Jan. 25, 2019  (DE) ...................... 10 2019 200 954.9

(51) Int. Cl.
*H04R 25/00* (2006.01)
*G06N 3/08* (2023.01)
(Continued)

(52) U.S. Cl.
CPC ........... *H04R 25/507* (2013.01); *G06N 3/044* (2023.01); *G06N 3/045* (2023.01); *G06N 3/08* (2013.01);
(Continued)

(58) Field of Classification Search
CPC ........ H04R 1/406; H04R 5/033; H04R 1/028; H04R 5/0335; H04R 3/005; H04R 1/40; H04R 7/00
See application file for complete search history.

(56) References Cited

U.S. PATENT DOCUMENTS

2007/0083365 A1    4/2007  Shmunk
2014/0270184 A1*   9/2014  Beaton ................... H04S 7/307
                                                            381/17
(Continued)

FOREIGN PATENT DOCUMENTS

WO    2011098140    8/2011
WO    2011100802    8/2011

OTHER PUBLICATIONS

International Search Report and Written Opinion received in International Application No. PCT/EP2020/051734.

*Primary Examiner* — Amir H Etesam
(74) *Attorney, Agent, or Firm* — ALG Intellectual Property, LLC

(57) ABSTRACT

A signal processing device for processing audio signals is described. The signal processing device has an input interface for receiving an input signal and an output interface for outputting an output signal. Moreover, the signal processing device has at least one first neural network for conditioning the input signal and at least one second neural network for separating one or more audio signals from the input signal. The at least one first neural network and the at least one second neural network are arranged sequentially.

20 Claims, 5 Drawing Sheets

Figure 1:
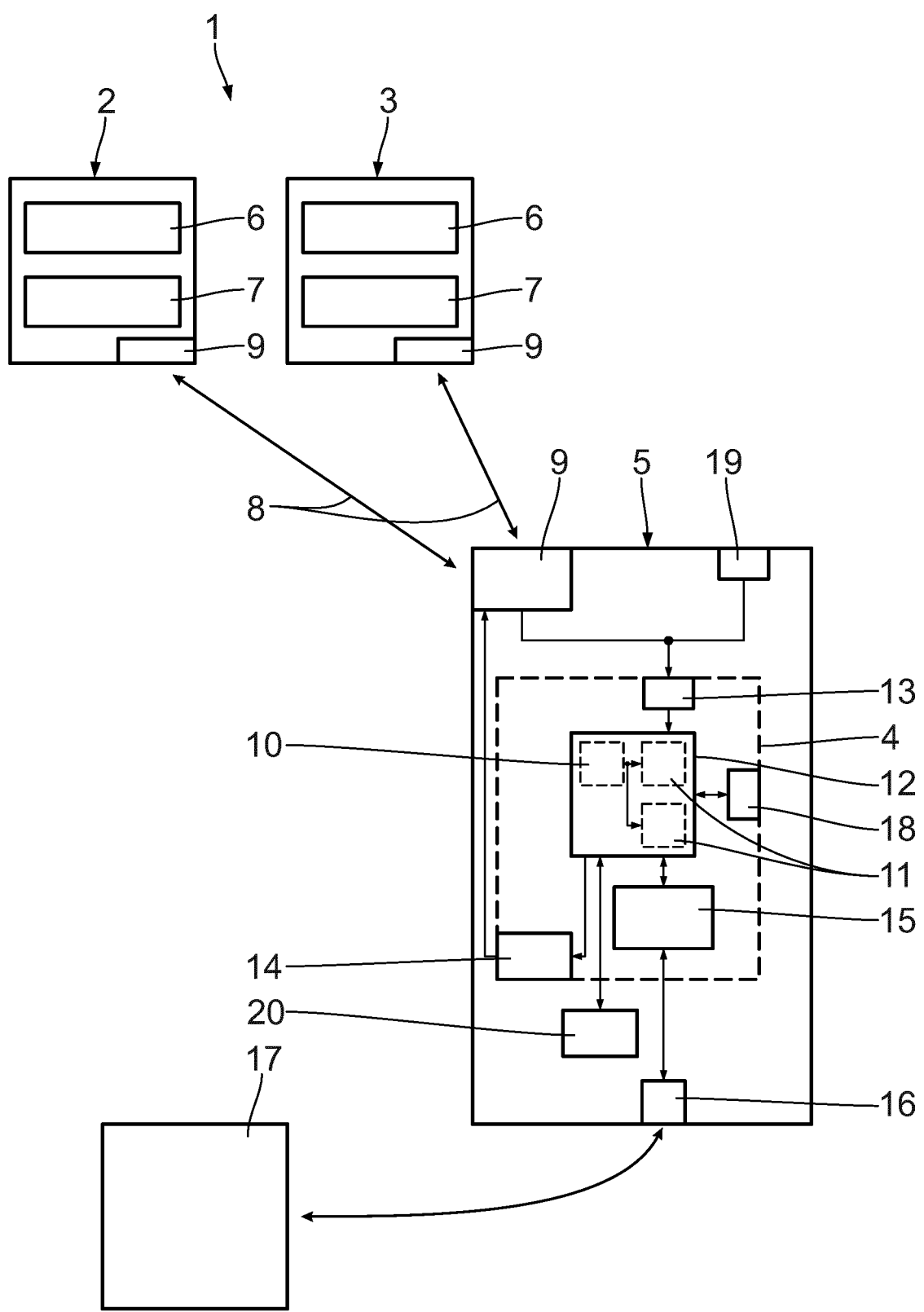

(51) Int. Cl.
*G10L 21/0272* (2013.01)
*G10L 25/30* (2013.01)
*G06N 3/044* (2023.01)
*G06N 3/045* (2023.01)

(52) U.S. Cl.
CPC .......... *G10L 21/0272* (2013.01); *G10L 25/30* (2013.01); *H04R 25/353* (2013.01); *H04R 2225/43* (2013.01)

(56) References Cited

U.S. PATENT DOCUMENTS

2015/0127327 A1 5/2015 Bacchiani
2018/0228682 A1 8/2018 Lederman
2019/0139563 A1 5/2019 Chen

* cited by examiner

SIGNAL PROCESSING DEVICE, SYSTEM AND METHOD FOR PROCESSING AUDIO SIGNALS

The present application claims priority of German patent application DE 10 2019 200 954.9 the content of which is incorporated herein by reference.

The inventive technology relates to a signal processing device for processing audio signals. Moreover, the inventive technology relates to a system, in particular a hearing device system, having such a signal processing device. The inventive technology moreover comprises a method for processing audio signals.

Signal processing apparatuses and methods for processing audio signals are known from the prior art. They are used in hearing devices, for example.

It is an objective of the present inventive technology to provide a signal processing device by means of which a processing of audio signals is improved. In particular, the aim is to provide a signal processing device that allows efficient separation of an input signal into individual or multiple audio signals. A particular objective of the present inventive technology is to facilitate the speech enhancement, in particular, to provide intelligible speech for hearing even if an input audio signal is noisy and/or has many components.

These objectives are achieved by a signal processing device having the features specified herein. The signal processing device has an input interface for receiving an input signal and an output interface for outputting an output signal. Moreover, the signal processing device has at least one first neural network for conditioning the input signal and at least one second neural network for separating one or more audio signals from the input signal. Here and below, the term "neural network" must be understood to mean an artificial neural network.

Here and in the following, the term "signal processing" generally refers to modifying and/or synthesizing signals. A subset of signal processing is "sound enhancement", which can comprise "speech enhancement". Sound enhancement generally refers to improving intelligibility or ability of a listener to hear a particular sound. For example, speech enhancement refers to improving the quality of speech in a signal so that a listener can better understand the speech.

The essence of the inventive technology is that the at least one first neural network and the at least one second neural network are arranged sequentially. The sequential arrangement of the at least one first neural network and the at least one second neural network means that these networks are connected in series for the processing of an input signal. In particular, the output from the at least one first neural network is used as an input for the at least one second neural network. The sequential arrangement of the neural networks allows functional division into different processing steps. As such, the conditioning of the input signal by using the at least one first neural network takes place independently of the separation of one or more of the audio signals from the input signal by using the at least one second neural network. This allows efficient processing of the audio signals, in particular efficient and accurate separation of the audio signals. The separation of the audio signals can take place in particular in real time, that is to say without significant delay. As such, for example the conditioning of the input signal by means of the at least one first neural network can take place such that the conditioned input signal can be processed particularly easily and efficiently by the at least one second neural network. This also increases the accuracy for the separation.

A further advantage of the signal processing device according to the inventive technology is the improved flexibility thereof As such, different first neural networks can be combined with different second neural networks in order to ensure processing of the audio signals that is customized to the respective input signal. It has been found to be particularly efficient to stipulate the at least one first neural network independently of the input signal, since the steps necessary for conditioning the input signal can be applied universally for all the different types of input signals. The at least one second neural network can then particularly preferably be customized to the respective audio signals to be separated from the input signal.

The input signal can be recorded for example by using one or more recording devices and can subsequently be transmitted to the input interface of the signal processing device. For each recording device, the input signal has one or more channels, for example. In this manner, it is possible for in particular stereo signals to be recorded.

The input signal as a rule comprises an unknown number of different audio signals. The different audio signals can come in particular from different sound sources, for example in interlocutors, passing cars, background music and/or the like. Preferably, the separation of one or more audio signals from the input signal takes place in source-specific fashion. In this case, the audio signal of a specific sound source, for example an interlocutor, is separated from the input signal. Particularly preferably, multiple audio signals are separated from the input signal. In this manner, the audio signals of different sound sources can be processed independently of one another. This allows selective processing and weighting of the individual audio signals. By way of example, the audio signal of an interlocutor can be amplified, while the conversations of people close by are rejected. The processing of the audio signals is possible in source-specific fashion. The split into individual audio signals, in particular into audio signals associated with individual sound sources, by using at least one neural network is an independent aspect of the inventive technology independently of the sequential arrangement of at least two different neural networks.

An exemplary input signal can comprise the last few milliseconds of continuously recorded audio data. In the case of typical audio signals having 16 000 samples per second, the input signal can comprise approximately 128 samples, for example. The input signal can be represented as a matrix, the number of rows of which corresponds to the number of samples and the number of columns of which corresponds to the number of channels in the input signal.

The conditioning of the input signal by means of the at least one first neural network can be regarded as part of a preparation step. Particularly preferably, the conditioning is effected by precisely one first neural network. This has been found to be practical, since it allows standard handling of the input signal, regardless of the constituents thereof, for example the channels and/or audio signals combined therein, to take place. In addition to the conditioning by using at least one first neural network, conventional conditioning of the input signal can take place. By way of example, the input signal, in particular multiple channels that the input signal contains, can be normalized.

The conditioning of the input signal has the advantage that the separation of one or more audio signals from the input signal does not require an audio format to be used. Rather, it is possible to transfer a representation of the input signal in tensor form to the at least one second neural network. In the present case, efficient and definite separation can take place.

The at least one second neural network can output a variable number of audio signals. Preferably, the at least one second neural network has a fixed number of outputs. When multiple second neural networks are used for separation, each can have a fixed number of outputs. In this case, each second neural network used for separating audio signals outputs a fixed number of audio signals separated from the input signal. The number of separated audio signals is therefore in proportion to the number of second neural networks used for separation and to the respective number of outputs. By way of example, all second neural networks can have three outputs. In this manner, when two second neural networks are used for separation, for example, it is possible for up six different audio signals to be separated from the input signal. However, it is also possible for the different second neural networks each to generate a different number of outputs.

In this manner, the number of audio signals separated from the input signal by using the at least one second neural network can be stipulated even more flexibly.

The audio signals that are output by the second neural networks may be arbitrarily coded. A further advantage of the sequential execution of conditioning and separation, however, is that the outputs of the at least one second neural network themselves may be coded as audio data or a precursor to audio data. It is possible for the audio signal itself to be optimized or conditioned by the at least one first neural network for use in at least one second neural network. By way of example, a conditioned audio signal that the first neural network outputs can be converted by the at least one second neural network into a multiplicity of new audio signals. This means that the at least one second neural network can operate in generative fashion.

The signal processing device according to the inventive technology can preferably be used for audio signal processing for at least one hearing device. The signal processing device can in particular be a hearing device or a component thereof Hearing impaired user can benefit from the improvements in audio signal processing that are produced by the signal processing device according to the inventive technology. A hearing device in the sense of the present inventive technology may include hearing aids, hearing implants, in particular Cochlear implants and/or auditory brainstem implants, and/or hearables.

Exemplary hearing aids comprise behind-the-ear hearing aids, in-ear-hearing aids, in-canal-hearing aids, hearing glasses and/or bone-anchored hearing aids. Exemplary hearables comprise smart headphones.

According to one advantageous aspect of the inventive technology, the signal processing device is configured for enhancing the one or more audio signals separated from the input signal. The signal processing device preferably is configured for sound enhancement of the audio signals. Sound enhanced audio signals can lead to a clearer output signal (e.g., with an improved signal-to-noise ratio). In particular, the signal processing device is configured for denoising the one or more audio signals. This is particularly advantageous when the signal processing is used for audio signal processing for at least one hearing device. Clearer audio signals, in particular clearer speech signals, can be easier understood by the hearing impaired.

Particularly preferable, the at least one second neural network is configured for enhancing, in particular denoising. the one or more audio signals upon separation from the input signal. The denoising is efficient. For example, the at least one second neural network can clean up the one or more audio signals separated from the input signal. Preferably, denoising can be achieved upon the separation of the one or more audio signals. For example, noise may be separated from the one or more audio signals using the at least one second neural network.

The first neural network and/or the at least one second neural network can be stored on a computer-readable medium, in particular a non-transitory computer-readable medium, in particular a data memory. An exemplary data memory is a hard drive or a flash memory. The signal processing device preferably comprises the computer-readable medium. The signal processing device may additionally or alternatively be in data connection with an external computer-readable medium on which the first neural network and/or the at least one second neural network are stored. The signal processing device may comprise a computing unit for accessing the computer-readable medium and executing the neural networks stored thereon. The computing unit may comprise a general processor adapted to perform arbitrary operations, e.g. a central processing unit (CPU). The computing unit may alternatively or additionally comprise a processor specialized on the execution of the first neural network and/or the at least one second neural network. Preferably, the computing unit may comprise an AI chip for executing the first neural network and/or the at least one second neural network. AI chips can execute neural networks efficiently. However, a dedicated AI chip is not necessary for the execution of the first and second neural networks.

Preferably, the details of the first neuronal network and/or the at least one second neuronal network and/or the modulation-functions used to modulate the audio signals, the gain models used to be applied to the audio signals can be modified, e.g., exchanged, by providing different neuronal networks and/or modulation-functions on computer readable media. By that, the flexibility of the system is enhanced. Furthermore, it is possible to refit existing systems, in particular existing hearing devices with the processing capability according to the present inventive technology.

The output signal may comprise the one or more audio signals separated from the input signal. For example, several separated audio signals may be combined to form the output signal. The individual audio signals may preferably be modulated prior to being included into the output signal. Herein, the term "modulation" can in general include any changes to the power spectrum of the audio signals. It comprises the application of specific gain models and/or frequency translations, also referred to as transpositions, and/or sound enhancement modulation, in particular clean-up steps, more particularly speech clean-up steps. Individual audio signals may be amplified or enhanced while others may be suppressed. Preferably, different gain models might be used to amplify specific audio signals. Specifically, modulation of the audio signal may comprise frequency translation of the audio signals. By frequency translation at least some parts of audio signals in particular certain frequency ranges or components contained therein, can be transposed to different frequencies. For example, frequency translation can be used to translate frequencies, which a user cannot hear, into frequencies, which the user can hear. Preferably, the frequency translation can be used to translate inaudible parts of the audio signal, e.g. high frequencies, into audible audio signals. This is particularly advantageous when the signal processing device is used for audio signal processing for at least one hearing device.

Preferably, the signal processing device comprises gain model algorithms and/or frequency translation algorithms.

Such algorithms may be stored on a computer-readable medium and may be executed by a computing unit of the signal processing device.

According to one advantageous aspect of the inventive technology, the signal processing device has a plurality of second neural networks, wherein each of the second neural networks is customized to a specific type of audio signals. This allows particularly efficient separation of specific types of audio signals from the input signal. The plurality of second neural networks customized to different types of audio signals means that the signal processing device is usable particularly flexibly and universally. The separation of the audio signals can take place by means of individual or multiple instances of a plurality of second neural networks. The second neural network used for separation may be selectable from the plurality of second neural networks depending on the input signal or other requirements.

The different types of audio signals are determined for example based on the respective sound sources thereof, for example human speakers or motor vehicles. The type of the sound sources may also be determined by a specific environment, for example road and traffic noise or background music in a shopping centre. The customization of the second neural networks to the respective type of audio signals takes place by training the neural networks, for example based on data records containing such audio signals.

According to one advantageous aspect of the inventive technology, at least two, three, four or more second neural networks are used in parallel for the separation of audio signals from the input signal. This allows a large number of different audio signals to be separated from the input signal. Moreover, flexibility is increased, since second neural networks specializing in different types of audio signals can be combined, so that the separation can take place for different types of audio signals in a simple and definite manner Preferably, the output from the at least one first neural network is used as an input, in particular as an identical input, for all second neural networks used in parallel for separation. This ensures that the different audio signals are reliably separated from the input signal.

According to a further advantageous aspect of the inventive technology, the at least one second neural network is replaceable. The at least one second neural network used for separating the audio signals is in particular selectable from a plurality of second neural networks specializing in different types of audio signals. The replaceability of the at least one second neural network allows the signal processing device to be flexibly customized to the respective input signals. The choice of the respective suitable at least one second neural network also improves accuracy for separating the audio signals from the input signal. Furthermore, the multiple second neural networks can be executed in parallel, in particular on an AI chip. The processing time of the signal is reduced further.

Preferably, individual or multiple instances of the plurality of second neural networks are replaceable independently of one another.

The sequential arrangement of the at least one first neural network and the at least one second neural network has the advantage of improved consistency of the signal in particular when the second neural network is replaced. By way of example, information is stored in the at least one first neural network and is not lost on replacement. An interruption to the audio signals and the separation thereof is avoided.

According to a further advantageous aspect of the inventive technology, the at least one first neural network and the at least one second neural network are part of a joint neural network. Such a signal processing device is particularly efficient. By way of example, the at least one first neural network and the at least one second neural network can be executed jointly, in particular on an individual processor, in particular on an AI chip. The at least one first neural network can be regarded as the body of the joint neural network, while the at least one second neural network acts as the replaceable head of the joint neural network. The joint neural network can in particular have a plurality of second neural networks that are replaceable flexibly and independently of one another. The joint neural network is in this case also referred to as a neural network with rotating heads.

The combining of the at least one first neural network and the at least second neural network in a joint neural network furthermore has the advantage that the output from the at least one first neural network is transferred directly as an input to the at least one second neural network. An additional output and/or conversion of the output from the at least one first neural network is avoided.

The at least one first neural network and the at least one second neural network are preferably trained jointly at first. After the at least one first neural network adequately specializes in the conditioning of the input signal, it suffices to continue to train the at least one second neural network in the separation of specific types of audio signals. The at least one first neural network can be left unaltered in this training phase.

Different data records can be used for training different second neural networks. By way of example, one of the second neural networks is configured to specialize in the separation of female voices and another second neural network is configured to specialize in the separation of warning signals in road traffic. The second neural networks each output audio signals of the type in which they specialize. A second neural network trained for female voices will therefore identify a female voice and output a corresponding audio signal. Each second neural network preferably has a plurality of outputs. A second neural network having multiple outputs that is trained for female voices can output multiple audio signals corresponding to different female voices. If a second neural network has more outputs than the input signal has audio signals of the type in which this second neural network specializes, further outputs of the second neural network can also contain other types of audio signals, for which the second neural network is not trained. On the other hand, the second neural networks may also be trained such that they output only audio signals of the type in which they specialize. By way of example, a network specializes in female voices would not output male voices. If the number of outputs from a second neural network is higher than the number of audio signals of the type for which the second neural network is trained, the excess outputs can output a blank signal. The blank signal corresponds to an audio signal that contains no sound, i.e., silence. If many outputs contain a blank signal of this kind, the number of second neural networks used can be reduced. The method is efficient and power-saving. This is particularly advantageous for mobile applications.

Alternatively, the second neural networks can be trained to output possible further audio signals in a manner concentrated in a remainder signal. By way of example, a network specializing in female voices can output male voices, road noise and further audio signals together as an additional remainder signal. The remainder signal can serve as a measure of unseparated audio signals. If such a remainder signal still comprises a large number of items of information, the number of second neural networks and/or the number of outputs for each second neural network can be increased. This allows the number of separated audio signals to be easily and flexibly customized to the input signal, in particular the number of audio signals it contains.

Different second neural networks can also be configured to specialize to a different degree by the training. By way of example, it is possible to train a second neural network for voices in general and to train further second neural networks only for one specific type of voice (deep, high, German, English, etc.) each. In this case, the second neural network that identifies voices in general can be used while only a few voices are detected. If the number of detected voices increases, multiple instances of the more highly specialized second neural networks can be used. The number of separated audio signals can be customized flexibly.

Different network architectures can be used for the at least one first neural network and the at least one second neural network. The architecture used for the neural networks is not significant for the separation of the audio signals from the input signal. However, Long Short-Term Memory (LSTM) networks have been found to be particularly suitable. Such an architecture is particularly advantageous if the input signal is only a few milliseconds of longer, in particular continuously recorded, audio data in each case. An LSTM architecture of the at least one first neural network permits information about a longer period of the audio data to be stored for a longer time. The stored information can then also be transferred to a previously unused second neural network and processed further there. As a result, it is in particular possible to initialize the at least one second neural network in optimum fashion.

In one preferred architecture, the at least one first neural network can have a 1D convolutional layer and at least one LSTM layer. Particularly preferably, the at least one first neural network has a 1D convolutional layer and two LSTM layers having for example 1024 and 512 units, respectively. The input signal can thus be put into a new, more compact representation. There may also be what are known as skip connections between different layers. This permits access to the original input signal and to all interim results. For the purpose of conditioning, the input signal can be converted by means of the 1D convolutional layer and improved by means of one or more LSTM layers.

In one preferred architecture, the at least one second neural network can have at least one
LSTM layer and at least one completely linked layer, also called dense layer. An exemplary second neural network can have for example two LSTM layers having 265 and 128 units, respectively, and two following completely linked layers having 128 and 64 units, respectively. The completely linked layers can be followed by a convolutional layer. Such an architecture permits the execution of the at least one second neural network using established hardware. By way of example, a first neural network and three second neural networks having the respective preferred architectures described above require a computing power of the 0.6 teraflops for execution. Established mobile phones have AI chips having 2 or more teraflops, for example 5 teraflops.

When there are a plurality of second neural networks, they can have the same or different architectures. In different second neural networks, the number of layers and units can vary. The number of units may be dependent on the specialization of the respective neural network. By way of example, training with specialized data records can be used to reduce the units. A second neural network trained only for road noise, for example, can have a substantially smaller architecture than a second neural network trained for general noise. When multiple second neural networks are used, the architecture thereof may be advantageously small. This increases the efficiency of the second neural networks. The neural networks of the signal processing device can be executed on any processors, for example. Specialized AI chips are not absolutely necessary.

According to a further advantageous aspect of the inventive technology, the signal processing device has a user interface for receiving user inputs and/or for outputting information to a user. The user interface can display for example information about the audio signals separated from the input signal to a user. The user can then prioritize individual instances of the audio signals manually. These user inputs can be used for processing the audio signals. General preferences of the user, for example rejection of ambient sounds, can also be transferred to the signal processing device by using the user interface and heeded for the processing the audio signals. The processing device is particularly highly individualizable.

According to a further aspect of the inventive technology, the signal processing device can comprise at least one means for classical audio processing. In particular, the signal processing device may comprise at least one means for classical audio signal separation. For example, the signal processing device may comprise a digital signal processor (DSP) and/or blind-source separation routines. Classical audio processing herein refers to but is not limited to digital signal processing steps or methods, for example filtering, masking, transformations, frequency-translations, compression-methods, blind-source separation methods.

Classical audio processing may be performed in parallel or alternatively to the processing by the first and second neural networks. Particularly preferable, the signal processing device may be configured to switch between classical audio processing and processing based on the neural networks. The signal processing device is highly flexible. For example, the signal processing device may use the audio processing by the neural networks when a fast and reliable separation of individual audio signals is needed. This may be the case for complicated input signals with many different audio signals. Alternatively, the classical audio processing means may be used to process simpler input signals, e.g. when the user is in a quiet surrounding with only a few sound sources. Classical audio processing has lower computational needs and requires less energy. Using the first and second neural networks only for the processing of complicated input signals reduces the power consumption of the signal processing device. The battery life is prolonged. The signal processing device may be used even if the power supply is low. Switching between classical audio processing and processing by neural networks can be executed automatically or based on user input. Preferably, switching to the classical audio processing can be a fallback option in case the processing by the neural networks fails.

The classical audio processing can comprise one or more routines of digital signal processing. It can comprise a selection of one or more methods from the following list. Linear regression, logistic regression, support vector machine, filtering techniques, masking techniques transformations, in particular Fourier transformations. It comprises in general a processing of the audio signals in the time domain and/or in the frequency domain and/or in the time-frequency domain.

According to a further advantageous aspect of the inventive technology, the signal processing device has at least one data memory for storing known types of audio signals. By way of example, voice patterns of specific speakers can be stored. The at least one data memory therefore permits already known information about audio signals to be archived. Audio signals freshly separated from an input signal can be compared against this data memory. As such, for example audio signals originating from sound sources known to the user, in particular speakers known to the user, can be identified. Furthermore, the relevance of the identified audio signals for the speaker can be ascertained from information saved in the data memory. By way of example, the voice pattern of family members of a user of the signal processing device can be stored, so that audio signals originating from said family members are amplified for the user.

Particularly preferably, the signal processing device can also store the known types of audio signals externally, for example in a cloud memory. This has the advantage that the user profile is not tied to one specific signal processing device. The user can continue to use the profile tailored to him when changing signal processing device.

The user can use the user interface to influence the number and type of separated audio signals, in particular. The user can in particular overwrite an automatic customization of the system. The user inputs can also be stored, and evaluated by the system. As a result, the system can automatically use the earlier user inputs to identify preferences of the user and adaptively customize itself thereto.

Preferably, the signal processing device is automatically customizable to user-specific data, system parameters, the input signal and/or audio signals already separated previously. In particular, the number and type of second neural networks used is automatically customizable. As a result, the variable number of audio signals separated from the input signal can be altered automatically and adaptively. The system is capable of learning and is customized to itself to the needs of the user.

The user-specific data available are for example the location and/or movement data of the user. As such, for example the location and the movement profile of the user can be used to ascertain that said user participates in the road traffic. In this case, a second neural network specializing in separation of traffic noise can be selected. The audio signals relevant for the user, for example an approaching car or a horn, are thus reliably separated from the input signal. The user-specific data can be ascertained by using appropriate sensors, for example, and can be transferred to the signal processing device.

Particularly preferably, the signal processing device is connected to further sensors and/or has further sensors in order to ascertain user-specific data and/or system parameters. Exemplary sensors may comprise at least one of the following sensors: position sensors, in particular GPS sensors, accelerometers, temperature sensors, pulse oximeters (PPG sensors), electrocardiographic sensors (ECG or EKG sensors), electroencephalographic sensors (EEG sensors) and electrooculographic sensors (EOG sensors). Using position sensors and accelerometers, the movement and position of a user can be determined, in order to change the separation of audio signal via the at least one second neural network. In particular a suitable second neural network can be selected based on the surroundings and the activities of the user. This is particularly advantageous when the signal processing device is used for audio processing for at least one hearing device. Sensors, in particular PPG sensors, ECG sensors, EOG sensors or temperature sensors, can be used to monitor health data of the user.

In particular, the input from a position sensing device, in particular a GPS, and/or an accelerometer can be used to determine if a user is walking, in particular to determine if a user is taking part in traffic. Depending on that, traffic noise, in particular car noise, can be selectively enhanced or suppressed.

A further object of the inventive technology is to improve a system, in particular a hearing device system, for processing audio signals. This object is achieved by a system having the features specified in herein.

The system has the signal processing device according to the inventive technology. Moreover, the system has at least one recording device for recording an input signal and at least one playback device for playing back an output signal. The at least one recording device is connected to the signal processing device via the input interface in a data-transmitting manner. The at least one playback device is connected to the signal processing device via the output interface in a data-transmitting manner The system has the advantages of the signal processing device that are discussed above.

According to one preferred aspect of the system, the system comprises at least one hearing device. Such a system is also referred to as a hearing device system. Preferably, the at least one hearing device comprises the at least one recording device and the at least one playback device. As described above, a hearing device in the sense of the present inventive technology may include hearing aids, hearing implants, in particular Cochlear implants and/or auditory brainstem implants, and/or hearables. Herein, the hearing device can comprise one, two or more output devices, in particular loud speakers, in particular miniature loud speakers or earphones. Such output devices are referred to as receiver.

According to a further aspect, the system can comprise two or more hearing devices.

In case of a hearing device system, the signal processing device can be incorporated in at least one of the at least one hearing device, in particular in each of the at least one hearing devices. Alternatively, the signal processing device can be separate from the at least one hearing device. In particular, the at least one hearing device is connectable to the signal processing device. The connection between the at least on hearing device and the signal processing device is preferably a wireless data connection. Due to their small size, hearing devices are regularly limited in computational power and/or battery capacity. Using an external device as the signal processing device overcomes these drawbacks. It is also possible, to employ some kind of distributed processing. In particular, some part of the one or more neuronal networks can be integrated in the at least one hearing device and another part of the one or more neuronal networks can be incorporated in an external device. Such distributed processing makes it possible, to perform some audio processing locally, i.e. in the hearing device. A partial processing by the external device, such as a mobile device, in particular a mobile phone or a virtual device, such as a cloud, which can host a plurality of neuronal networks, in particular to perform partial audio processing and provide partially processed audio signals to the hearing device, can be particularly flexible and thereby improve a selective signal enhancement, in particular with low latency.

In case of an external processing of the audio signals by neuronal networks, the processing can be executed on a mobile device, in particular a mobile phone or an external microphone, or a cloud, hosting a plurality of neuronal networks for performing audio processing and/or providing processed audio. The hearing device component worn by the user, in particular close to the ear, transmits audio signals and receives processed audio, in particular via a low latency connection, such as standard Bluetooth, modified Bluetooth, such as Roger, 3G, 4G or 5G. Herein, Roger refers to a wireless communication protocol that a microphone can use to implement better transmission of audio. Details of this protocol can be found in WO 2011/098140, the content of which is hereby incorporated by reference.

In case of internal processing of audio signals by neuronal networks incorporated into the hearing device, such hearing device hosts the most suitable neuronal network or most suitable neuronal networks or in general one or more neuronal networks and performs audio processing locally. A connection to a mobile device or a cloud hosting a plurality of neuronal networks can be provided to the hearing device upon request.

According to one preferred aspect of the system, the at least one hearing device comprises at least one classical audio processing means, for example a digital signal processor (DSP) and/or blind-source separation routines. Preferably, the at least one classical audio processing means for audio processing of the at least one hearing device may be used to at least temporarily replace the audio processing by a separate signal processing device. In particular, the at least one classical audio processing means may be used to at least temporarily replace the audio signal processing using the first and second neural networks. For example, when the signal processing device is switched off or otherwise not connected to the at least on hearing device, the input signal may be processed by the at least one classical audio processing means of the at least one hearing device. Further, the at least one classical audio processing means can replace the audio processing by the first and second neural networks in order to save energy. This is particularly advantageous in situations in which the high quality audio signal processing using the first and second neural networks is not required, e.g. in quiet surroundings, or as a fallback option.

The signal processing device may be connected to the recording device and the playback device, in particular to the at least one hearing device, by any kind of suitable data connection. Preferably, the data connection is wireless. For example, the data connection may be based on a standard or modified Bluetooth protocol or on a 3G, 4G or 5G protocol. The wireless data connection may preferably be implemented with a proprietary protocol. An exemplary proprietary protocol is the Roger protocol by Phonak AG. Other exemplary proprietary protocols may be Bluetooth low energy protocols, which are implemented by modifying the Bluetooth protocol. Proprietary protocols do present the advantage of permitting to reach a lower audio delay than the audio delay that can be achieved with standard protocols.

The playback device is in particular a loudspeaker, preferably headphones, particularly preferably in-ear headphones, as used in hearing devices.

The at least one recording device is in particular a microphone. Preferably, there is provision for multiple physically separate microphones. By way of example, two hearing devices may be equipped with one microphone each. Additionally, it is possible for further microphones, for example microphones on a mobile phone and/or a wristwatch, in particular a smartwatch, to be used. Alternatively or additionally, it is also possible for further microphones to be used. By way of example, further microphones can be coupled to the signal processing device, in particular to a mobile phone comprising the signal processing device. Preferably, a further microphone may be designed to pick up sounds from a 360° area. Additional devices of this kind can moreover also be used for the data connection between the hearing devices and the signal processing device. Even before conditioning using the first neural network, the audio signals can be located in space.

This already allows substantial information about the audio signals to be obtained. This improves the accuracy of the system.

According to one preferred aspect of the system, the at least one signal processing device is in the form of a mobile device, in particular in the form of part of a mobile phone. This ensures a high level of flexibility for the system, in particular the hearing device system. Modern mobile phones have a high level of computing power and storage battery capacity. This allows autonomous operation of the system over longer periods. Moreover, this embodiment has the advantage that the system can be realised using hardware that a user carries anyway. Additional devices are not necessary.

A signal processing device embodied as part of a mobile phone may be realised by components of the mobile phone. Particularly preferably, this involves the normal hardware components of the mobile phone being used by virtue of software, for example in the form of an App, being executed on the mobile phone. By way of example, the at least one first neural network and the at least one second neural network, in particular in the form of a joint neural network, can be executed on an AI chip of the mobile phone. In other cases, the mobile phone can comprise hardware components designed specifically for the signal processing device.

According to a further advantageous aspect of the inventive technology, the signal processing device comprises a wireless microphone. It can also be built into a separate device comprising external microphone and a wireless transmitter. Exemplary wireless microphones are assistive listening devices used by hearing impaired persons to improve understanding of speech in noise and over distance, such as the Roger Select microphone manufactured by Phonak AG. Wireless microphones can be equipped with sufficient computing power and battery capacity as needed for running complex neural networks, possibly using a co-processor dedicated to the neural network execution. This allows independent operation of the hearing device system, in particular even for computationally complex operations by the signal processing device. Moreover, this has the advantage that the hearing device system is realizable by hardware that a hearing impaired user carries anyway. Additional devices are not necessary. It is furthermore advantageous that the user, owing to the functional split according to the inventive technology, can use the computing power of the mobile phone for other activities completely without the audio signal processing by the system being limited.

According to a further advantageous aspect of the inventive technology, the system is of modular design. This ensures flexible customization of the system to the respective user preferences. Individual components of the system can be replaced, in particular in the event of defect.

By way of example, one or more hearing devices can be combined with any mobile phone on which the appropriate software is installed.

A further object of the inventive technology is to provide an improved method for processing audio signals.

This object is achieved by a method having the steps specified herein. First of all, the signal processing device according to the inventive technology is provided. Moreover, an input signal is provided. This can be effected by means of an at least one recording device, for example. The input signal is supplied to the signal processing device via the input interface. The input signal is then conditioned by using the at least one first neural network. The at least one second neural network that sequentially follows the at least one first neural network is used to separate individual or multiple audio signals from the conditioned input signal. For each of the separated audio signals, a priority parameter is determined. On the basis of the respective priority parameter, each audio signal is modulated. Subsequently, the modulated audio signals are combined to produce an output signal that is output via the output interface. The output signal is in particular provided to a receiver. Herein, the signal transmission can be wired or wireless. It can in particular use a proprietary signal transmission protocol. This can enhance a low latency signal transmission.

The separation of individual or multiple instances of the audio signals allows them to be advantageously modulated separately in the method. This allows independent customization of the individual audio signals, which can be individually customized to the respective user. The priority parameter is preferably continuous, so that the modulation can be continuously customized to the relevance of the respective audio signals and/or to the preferences of the user. By way of example, the priority parameter can be between 0 and 1. The lowest relevance would then belong to audio signals having the priority parameter 0, which are rejected completely. The highest priority would belong to audio signals having the priority parameter 1, which would cause a maximum gain for the audio signal. Alternatively, the priority parameter may also be discrete, so that the different audio signals are categorized into different classes.

According to one aspect of the inventive technology, the priority parameter is determined exclusively based on physical parameters of the audio signal. The content, in particular the semantic contents, of the audio signals does not need to be analysed for the determination of the priority parameter. However, such semantic analysis is possible, as well.

According to one advantageous aspect of the method, the separated audio signals are classified. This must be understood to mean that the audio signals are categorized into different groups corresponding to the respective type of audio signal. Preferably, the at least one second neural network is customized to one specific type of audio signals, as described above. A second neural network customized in this manner preferably separates audio signals of the respective type from the input signal. In this manner, the separating of the audio signals by using the at least one neural network performs implied classification of the separated audio signal. The classification can also take place after the separation, however, for example by virtue of the audio signals being analysed asynchronously and/or combined with further user-specific data.

Particularly preferably, the audio signals are not only classified but also identified. As such, for example not only the type of audio signal but also a specific source of the audio signal can be identified. As such, the at least one second neural network can first of all be used to classify the audio signal implicitly as spoken voice. An analysis of the separated audio signal, for example by means of a comparison against known audio signals stored in a data memory, can then identify the respective speaker.

According to a further advantageous aspect of the method, the selection of the at least one second neural network from an available set of different second neural networks is made on the basis of user-specific data and/or already separated audio signals. The selection of the at least one second neural network is customized to the method to the respective input signal and audio signals it contains even better. The user-specific data available in this case are for example the location and/or movement data of the user. As such, for example the location and the movement profile of the user can be used to ascertain that said user participates in road traffic. In this case, a second neural network specializing in separation of road noise can be selected. The audio signals relevant for the user, for example an approaching car or horn, are thus reliably separated from the input signal and can be modulated in accordance with their respective relevance.

The selection of the at least one second neural network can additionally or alternatively be made on the basis of already separated audio signals. By way of example, a separated audio signal can be identified as an approaching motor vehicle. In this case, it is likewise possible for the second neural network specializing in traffic noise to be selected in order to be able to reliably separate audio signals originating from different motor vehicles. The heeding of already separated audio signals for the selection of the at least one second neural network means that the method is self-adaptive.

The selection of second neural networks can additionally or alternatively be made on the basis of system parameters. Exemplary system parameters are a computing power available to the signal processing device and/or the storage battery state of charge that is still available to the signal processing device. If for example the remaining storage battery state of charge falls below a predetermined limit value, the number of second neural networks can be decreased in order to perform energy-saving separation. Alternatively, second neural networks having fewer outputs can also be used in order to allow separation with lower power consumption. The number of second neural networks used, in particular the number of audio signals separated from the input signal, also allows the respective computing power available to the signal processing device to be customized. This is in particular advantageous if the signal processing device is part of a mobile phone. By way of example, a processor of the mobile phone can be used not only to execute the second neural networks but also for other computing operations. If the processor is occupied by such other computing operations, the number of second neural networks can be reduced. The signal processing device does not limit other use of the mobile phone by the user in principle.

According to a further advantageous aspect of the method, the determination of the priority parameters takes place asynchronously in relation to the further steps of the method. The determination of the priority parameters may require a further analysis of the separated audio signals. The asynchronous determination of the priority parameters ensures that the determination does not slow down the modulation of the audio signals and the output of the output signal. The modulation of the audio signals and the output of the output signal can take place without delay. The user hears the modulated audio signals in real time. This increases safety and accuracy for performance of the method.

The asynchronous determination of the priority parameters means that the priority parameters are customized in steps, in particular. The customization can take place at fixed intervals of time or at dynamically customizable intervals of time. This can be dependent on the respective use situation. By way of example, the customization would take place in short cycles if the input signal, in particular the audio signals it contains, and/or the priority parameters can change often and quickly, for example when the user participates in road traffic. On the other hand, the customization would take place in longer cycles if a change in the priority parameters is not to be expected, for example when watching television. The customization can take place up to once every 5 milliseconds. The customization can also take place only once per second. Preferably, the customization takes place no more seldomly than once every 10 minutes. The customization rate can be varied, preferably dynamically, between once every 5 milliseconds and once every 10 minutes. Alternatively or additionally, customization can take place on the detection of specific signals. Such signals may be a horn or a signal word, such as for example "hello".

Particularly preferably, further steps of the method can also be customized on the basis of user-specific data and/or already separated audio signals. By way of example, conventional conditioning of the input signal can take place on the basis of the number of audio signals that the input signal contains.

According to a further advantageous aspect of the method, the determination of the priority parameters takes place on the basis of user-specific data, preferences of the user and/or an information content of the respective audio signals.

The user-specific data, for example a location or a pattern of movement of the user, can be used to determine the surroundings of the user, for example. Depending on the surroundings, different priority parameters are determined. By way of example, audio signals originating from motor vehicles are amplified if the user participates in road traffic, where the auditive detection of the audio signals from other road users is relevant to safety. If the user does not participate in road traffic, however, for example sits in a pavement café, these sounds are rejected.

User information allows the preferences of the user to be heeded, for example specific people are amplified particularly significantly, while other sounds, disturbing the user, can be selectively rejected. The determination of the priority parameters on the basis of the information content of the respective audio signal is particularly advantageous. By way of example, a horn or a cry of "Watch Out!" can be amplified in order to attract the attention of the user, in particular in dangerous situations. In order to be able to determine the information content of the audio signal, the audio signal can be transcribed, for example, and the transcribed content can be evaluated.

Particularly preferably, the audio signals separated from the input signal are improved. By way of example, it is possible for a noise attributable to a poor microphone not to be separated from the input signal with the audio signals. The audio signals therefore have a high quality regardless of the microphones used. Additionally or alternatively, the audio signals can also be conditioned after the respective separation. This can be accomplished by using further neural networks and/or filters. The output signal assembled from the audio signals has a high quality. In particular when the method is performed in a hearing device system, the user can detect the audio signals that the output signal contains in auditively simple and reliable fashion. Audio signals containing spoken voice are clearly and distinctly comprehensible.

According to a preferred aspect of the method, the one or more audio signals separated from the input signal are enhanced. In particular, the one or more audio signals are denoised. The quality of the audio signals and with that the quality of the output signal is increased. Sound enhancement, in particular denoising, can be advantageously achieved by the at least one second neural network.

According to a preferred aspect of the method, modulation of the one or more audio signals comprises amplification or enhancement and/or frequency translation and/or clean-up of at least parts of the one or more audio signals. Amplification can for example be achieved by various gain models. Frequency translation can be used to translate inaudible frequencies, e.g. high frequencies, into audible frequencies, e.g. lower frequencies. This is particularly advantageous for speech information which might comprise high frequency components inaudible to some people, in particular hearing impaired or elderly people.

Figure 2:
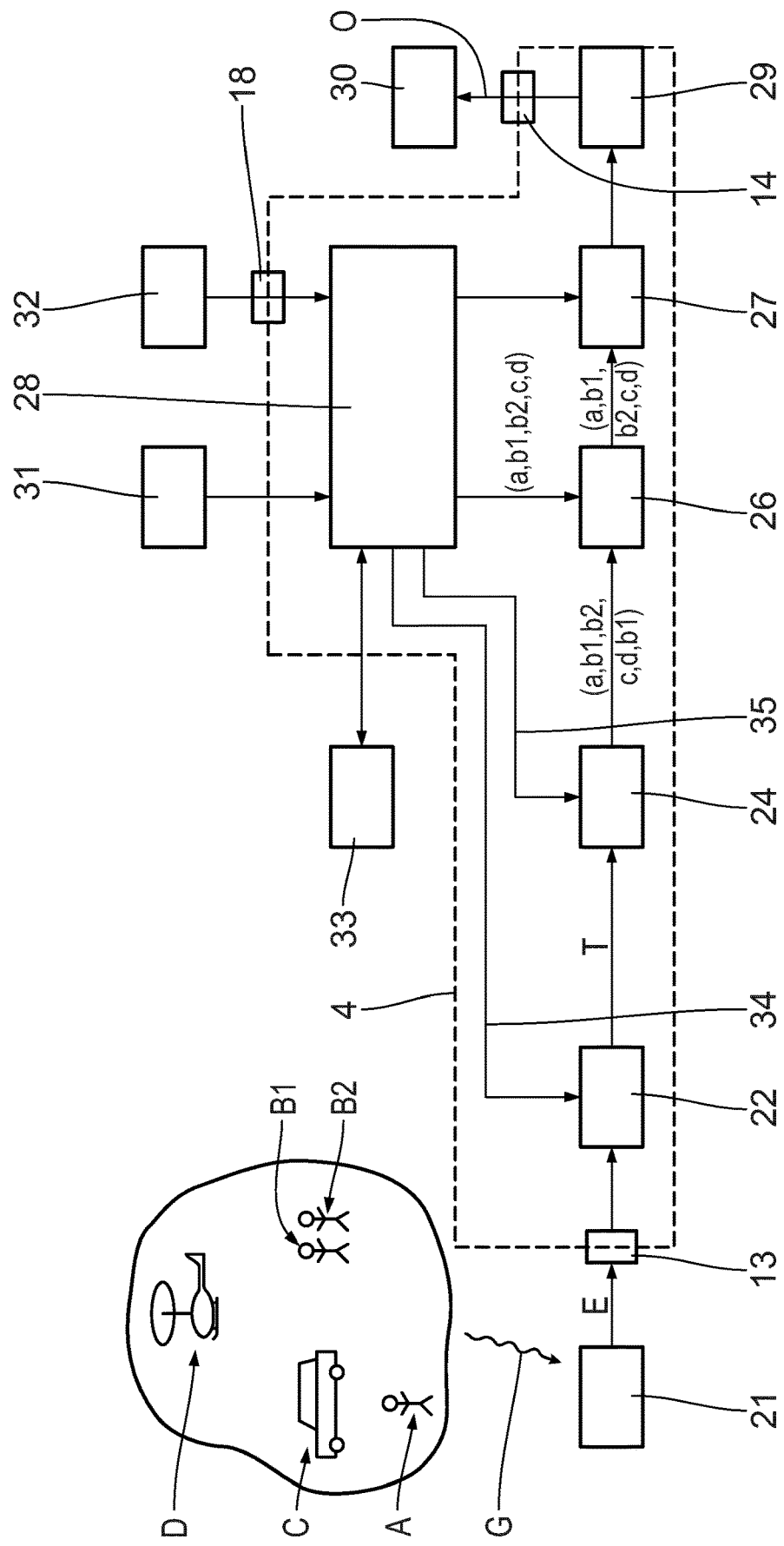
Figure 3:
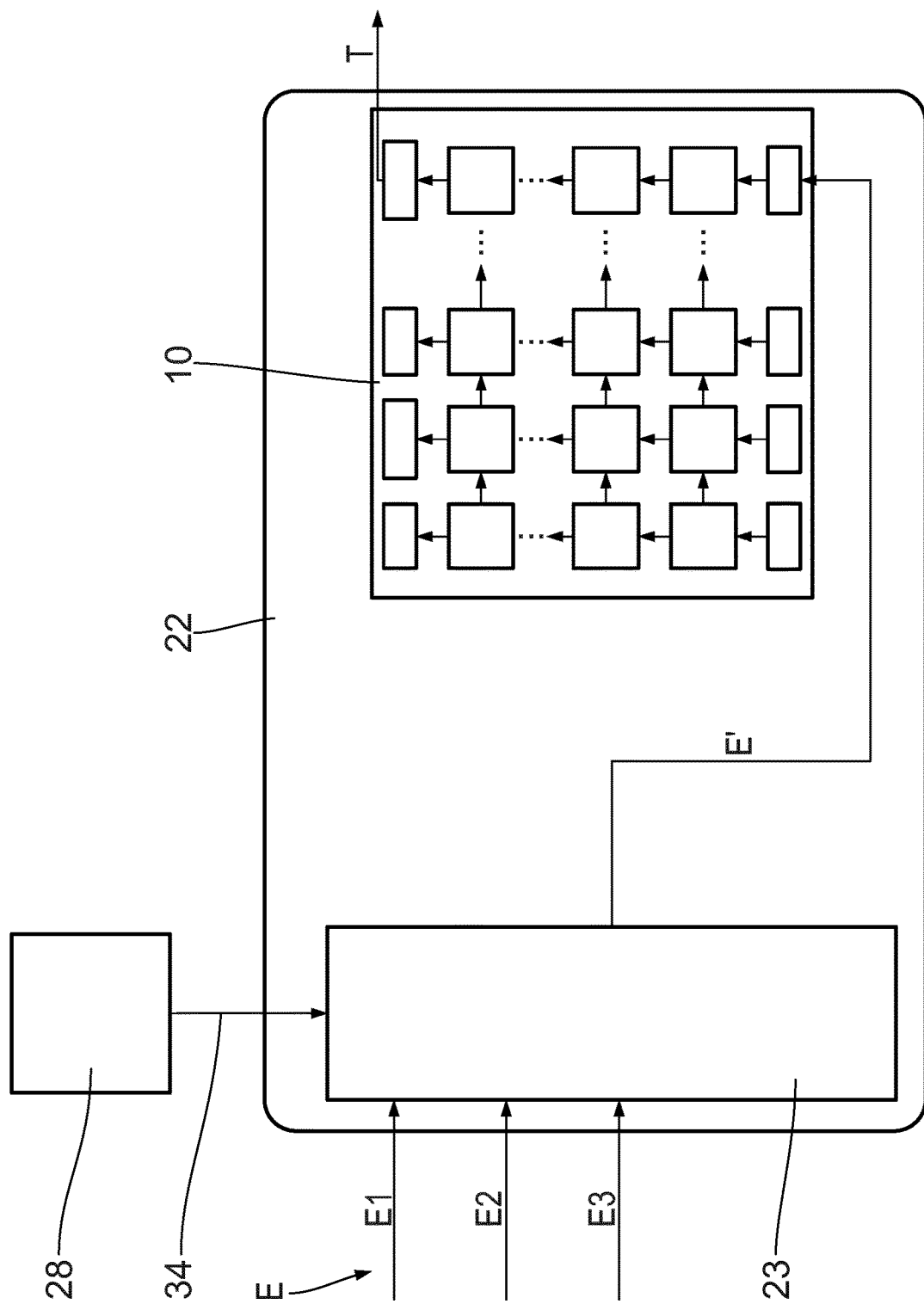
Figure 4:
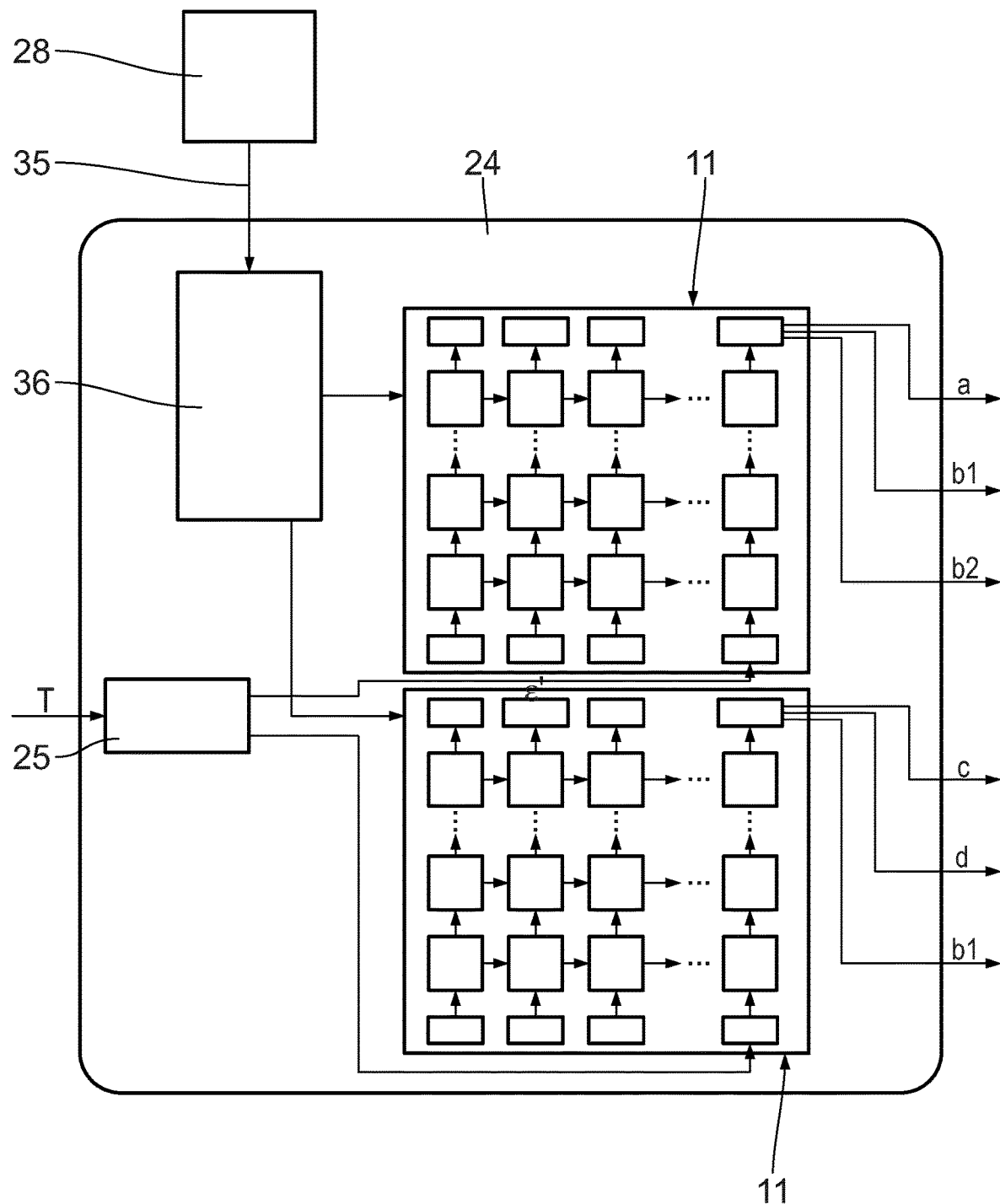
Figure 5:
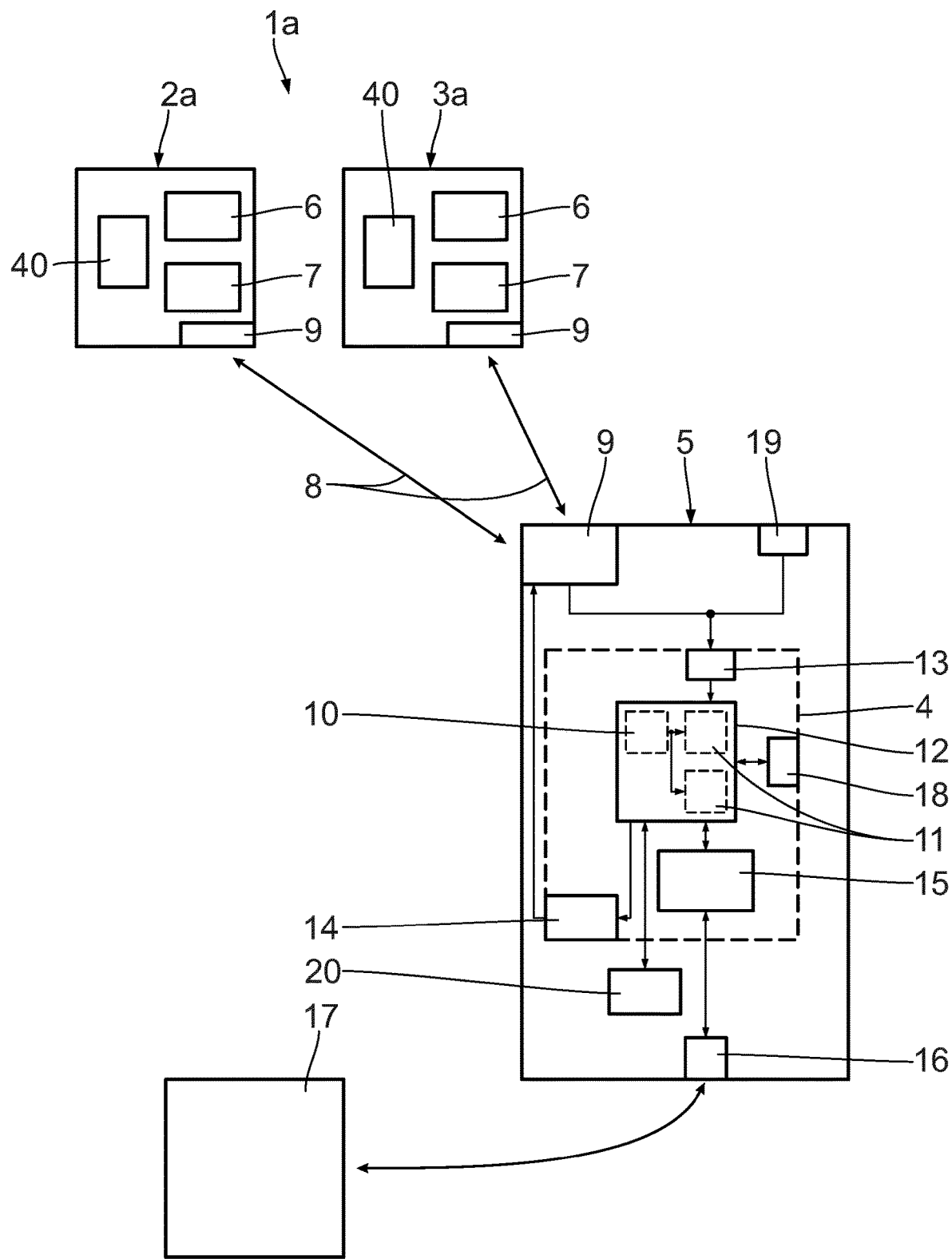

Further details, features and advantages of the inventive technology are obtained from the description of an exemplary embodiment on the basis of the figures, in which:

FIG. 1 shows a schematic depiction of a system for processing audio signals, FIG. 2 shows a schematic method sequence for the processing of audio signals by using the system shown in FIG. 1, FIG. 3 shows a schematic depiction of a preparation step of the method shown in FIG. 2, FIG. 4 shows a schematic depiction of a separation step of the method shown in FIG. 2, and FIG. 5 shows a schematic depiction of a further embodiment of a system for processing audio signals.

FIG. 1 schematically shows a system for processing audio signals in the form of a hearing device system 1. The hearing device system 1 comprises two hearing devices 2, 3 that can be worn on the left and right ears of a user. Additionally, the hearing device system 1 has a signal processing device 4. The signal processing device 4 is part of a mobile device 5. In the exemplary embodiment, the mobile device 5 is a mobile phone. That means that the signal processing device 4 is realized by components of the mobile device 5 in form of the mobile phone. In the exemplary embodiment depicted, the signal processing device 4 is realized by virtue of the components of the mobile phone 5 executing appropriate software, which can be installed on the mobile phone 5 as an app, for example. The signal processing device 4 thus uses the hardware of the mobile phone 5, the hardware components used by the signal processing device being depicted in a manner delimited by a dashed line in FIG. 1. The hearing device system 1 is of modular design. Different mobile phones can be used to realize the signal processing device 4. It is also possible for just one of the hearing devices 2, 3 to be coupled to the signal processing device 4.

In other exemplary embodiments, not depicted, there may be provision for separate hardware components in a mobile phone for realizing the signal processing device 4. In yet other exemplary embodiments, not depicted, the signal processing device 4 is realized on other mobile devices 5, for example smartwatches or a wireless microphone. It is also possible for the signal processing device 4 to be integrated directly in one of the hearing devices 2, 3.

The hearing devices 2, 3 each have a microphone 6 and a loudspeaker 7. The hearing devices 2, 3 are each connected to the mobile phone 5 via a wireless data connection 8. In the exemplary embodiment depicted, the data connection 8 is a standard Bluetooth connection. For this purpose, the mobile device 5 and the hearing devices 2, 3 each have a Bluetooth antenna 9.

In other exemplary embodiments, it is also possible for other types of data connections to be used. Exemplary types of data connections comprise proprietary data connection protocols, such as the Roger protocol by Phonak AG or proprietary protocols based on modifications of the Bluetooth protocol. The data connection can in particular also be made via additional devices.

The signal processing device 4 has a first neural network 10 and a plurality of second neural networks 11. FIG. 1 depicts two second neural networks 11 in exemplary fashion. The number of second neural networks 11 can vary, however, as will be described below. The first neural network 10 and the second neural networks 11 are arranged sequentially, i.e. an output from the first neural network 10 serves as input for the second neural networks 11. The first neural network 10 and the second neural networks 11 are part of a joint neural network executed by using the signal processing device 4. As already described above, the signal processing device 4 is realized by components of the mobile phone 5. In the exemplary embodiment depicted, the neural networks 10, 11 are therefore executed on a computing unit 12 of the mobile phone 5. The computing unit 12 of the mobile phone 5 has an AI chip, by means of which the neural networks 10, 11 can be executed particularly efficiently. The AI chip has 2 teraflops or more, for example.

The signal processing device 4 moreover has an input interface 13 for receiving an input signal and an output interface 14 to the output location of an output signal. Moreover, there is provision for a data memory 15 that can be used to store process-relevant data. A further data interface 16 can be used to store the data stored in the data memory 15 in an external memory 17 too. A cloud memory has been found to be particularly suitable for the external memory 17. The data interface 16 may in particular be a mobile phone network or WLAN interface. Moreover, the signal processing device 4 has a user interface 18. The user interface 18 can be used to output data to a user by virtue of said data being displayed on a display, not depicted, of the mobile phone 5, for example. Moreover, the user interface 18 can be used to transfer user inputs, for example via a touchscreen, not depicted, of the mobile phone 5, to the signal processing device 4.

The mobile phone 5 has at least one further microphone 19 that is connected to the input interface 13. Moreover, the computing unit 12 is connected to further sensors 20 of the mobile phone 5. As such, the signal processing device 4 can access for example location data ascertained by using a GPS sensor and/or motion data of the user that are ascertained by using a motion sensor.

The data memory 15 and the external memory 17 are non-transitory computer-readable media. In the exemplary embodiment, the neural networks 10, 11 are stored on the data memory 15. Further, the neural networks 10, 11 may be stored on the external memory 17. The computing unit 12 can access the data memory 15 and/or the external memory 17. The computing unit 12 can execute the neural networks 10, 11.

In the exemplary embodiment, the first neural network 10 comprises a 1D convolutional layer and two LSTM layers having 1024 and 512 units, respectively. The input signal can thus be put into a new, more compact representation. Skip connections between the layers also allow access to the original input signal and to all interim results. The second neural networks 11 have two LSTM layers having 265 and 128 units, respectively. The LSTM layers of the second neural networks 11 are followed by two completely linked layers having 128 and 64 units, respectively, and a 1D convolutional layer. In other exemplary embodiments, the neural networks 10, 11 can have different numbers of layers and/or units or can have entirely different structures. The architecture used for the neural networks is not important for the separation of the audio signals from the input signal.

The neural networks 10, 11 are used for separating individual audio signals from an input signal. The first neural network 10 is used in this case to condition an input signal comprising different audio signals such that the second neural networks can perform an efficient separation of audio signals from the input signal. The conditioning takes place regardless of the form of the respective input signal. Therefore, the same first neural network 10 is always used regardless of the input signal. This is particularly efficient. The input signal comprises the last few milliseconds of audio data continuously recorded by using the microphones 6, 19. A rate of 16 000 samples per second for the audio data, the input signal comprises approximately 128 samples per channel The input signal is processed in the form of a two-dimensional tensor (matrix), with the number of columns representing the number of channels and the number of rows representing the number of samples. The signal is processed at a resolution of 16 bits, which increases efficiency without significantly influencing voice quality. The input signal is first of all converted in the first neural network 11 by the 1D convolutional layer and conditioned by means of the LSTM layers.

The second neural networks 11 are each customized to the detection and separation of specific types of audio signals, for example spoken voice or traffic noise. The second neural networks 11 are therefore selected on the basis of respective audio signals to be separated from the input signal. For this purpose, the signal processing device 4 has a multiplicity of second neural networks customized to different types of audio signals. The number and composition of the second neural networks therefore varies with the respective input signal, as will be described in detail later on.

The first neural network 10 and the second neural networks 11 together form a joint network. The first neural network 10 in this case forms the body of the joint neural network, which is used to accomplish ever occurring identical tasks. The second neural networks 11 form rotating heads of the joint neural network that are able to be replaced depending on the situation. Therefore, a particularly efficient combination is produced between the first neural network 10 and the second neural networks 11 without limiting the flexibility of the separation of the audio signals. The combination of the variable second neural networks 11 with the first neural network 10 ensures in particular a level of continuity for the separation of the audio signals. A loss of information on account of one or more of the second neural networks 11 being changed is avoided, since information is stored in the first neural network 10. This is particularly advantageous because the input signal comprises only a few milliseconds. The LSTM architecture can be used to store information about a longer period of the recorded audio data in the first neural network 11. This information can then be transferred to the new second neural networks even after second neural networks are replaced. The new second neural networks can be initiated in optimum fashion on the basis of the stored information.

The signal processing device 4 enhances the audio signals which are detected and separated by the neural networks 10, 11. By separating the audio signals from the input signal and noise contained in the input signal, the audio signals are denoised by the second neural networks 11. Additionally, the signal processing device 4 may further clean up the audio signals, e.g. by using clean-up routines which are stored on the data memory 15 and/or the external memory 17 and which are performed by the computing unit 12. The signal processing device 4 enhances the sound quality of the separated audio signals.

Referring to FIGS. 2 to 4, a specific example is used to describe the separation of individual audio signals in detail.

To this end, the individual steps required therefor are divided into functional steps, as are depicted in FIG. 2, regardless of the hardware components usable therefor.

In the situation depicted in FIG. 2, the user of the hearing device system 1 is confronted with different sound sources. Depicted in exemplary fashion is a speaker A conversing with the user of the hearing device system 1. Furthermore, two conversing passers-by B1 and B2 are within earshot. Moreover, a car C and a helicopter D can be heard.

The sounds G emitted by the sound sources are recorded and digitized by using the microphones 6 of the hearing devices 3 and the microphone 19 of the mobile phone 5 in a recording step 21. The data connection 8 is used to transmit the sounds recorded and digitized by means of the microphones 6 to the mobile phone 5. The sounds ascertained by using the microphones 6 and the microphone 19 are combined into an input signal E containing one channel E1, E2, E3 per microphone 6, 19 and are transmitted to the input interface 13 of the signal processing device 4. In the exemplary embodiment depicted, the signal processing device 4 uses some of the components of the mobile phone 5, the components used by the signal processing device being delimited by a dashed line. The input signal E is conditioned in a preparation step 22. The preparation step 22 is shown in detail in FIG. 3. The input signal E contains the channels E1, E2, E3 corresponding to the different microphones 6, 19. First of all, the input signal E is conditioned during a conventional preparation 23. By way of example, the different channels E1, E2, E3 of the input signal E can be taken as a basis for effecting a preclassification of the different audio signals, for example by virtue of the relative position being ascertained on the basis of the different, known positions of the microphones. In the conventional conditioning 23, the individual channels E1, E2, E3 of the input signal E are moreover normalized and combined into a standard input signal E' comprising all the channels E1, E2, E3. The joint input signal E' is a standardized representation of all the recorded sounds. The joint input signal E' serves as input signal for the first neural network 10. The first neural network 10 is depicted purely schematically in FIG. 3. The first neural network 10 conditions the joint input signal E' for the further separation of the individual audio signals in E'. The conditioned input signal is output by the first neural network 10 in the form of a tensor T. When the tensor T is output, the preparation step 22 ends. The individual channels E1, E2, E3 contain different mixes of the audio signals of the respective sound sources.

The preparation step 22 is followed by a separation step 24. The separation step 24 is shown in detail in FIG. 4. In separation step 24, individual audio signals are separated by using the second neural networks 11. The second neural networks 11 are depicted purely schematically in FIG. 4. In the exemplary embodiment shown, two different second neural networks 11 are used therefor. This involves the tensor T ascertained in the preparation step 22 by using the first neural network 10 initially being replicated in a replication step 25 in accordance with the number of second neural networks 11. This ensures that all of the second neural networks 11 used in the separation step 24 are provided with the same input, namely the tensor T. In other words, the tensor T ascertained by the first neural network 10 is transferred to all second neural networks 11. The two second neural networks 11 used in the separation step 24 are customized to different types of audio signals. Each of the second neural networks outputs a specific number of outputs. The number of outputs is constant for each of the second neural networks 11, but may be different for different instances of the second neural networks 11. In the exemplary embodiment depicted, the two second neural networks 11 used each output three outputs.

The second neural network 11 depicted at the top in FIG. 4 specializes in the detection and separation of spoken voice. This network will detect the audio signals a, b1, b2 that the tensor T contains for the interlocutor A and the further passers-by B1 and B2, respectively, and will separate them from the tensor T. The outputs of the second neural network 11 depicted at the top therefore correspond to the audio signals of the interlocutor A and the further passers-by B1 and B2.

The second neural network 11 depicted at the bottom in FIG. 4 specializes in the detection and separation of traffic noise. This network will detect the audio signals c and d that the tensor T contains for the car C and the helicopter D, respectively, and will output them as audio signals. Owing to the fixed number of outputs per second neural network 11, the second neural network 11 depicted at the bottom will also separate and output a further audio signal that the tensor T contains. In the example depicted, this is the spoken voice produced by passer-by B1.

Since the different second neural networks 11 are customized to different types of audio signals, they preferably separate the respective types of audio signals, for example audio signals from specific types of sound sources, such as for example cars or speakers. The separation by using the second neural networks 11 therefore classifies the audio signals according to their respective type, in particular their respective origin. The separation of the audio signals by using the second neural networks 11 therefore already permits conclusions to be drawn about the type of the respective audio signals.

The second neural networks 11 are used not only to separate but also to improve the audio signals. A noise originating from a poor microphone 6, 19, for example, is not separated from the input signal together with the audio signals. The audio signals are denoised and the sound quality is enhanced. The signal processing device allows a high level of quality for the audio signals regardless of the microphones 6, 19 used. When the individual audio signals are output, the separation step 24 ends.

Before the further processing of the separation audio signals, said audio signals are checked for duplicates in a merging step 26. Should individual instances of the outputs from the second neural networks 11 contain the same audio signal, these outputs are merged. In the exemplary embodiment depicted, this relates to the speech of the passer-by B1, which two outputs from the second neural networks 11 contain. After the merging step 26, each of the audio signals is unique.

The merging step 26 is followed by a modulation step 27. In the modulation step 27, the audio signals are modulated, i.e. the individual audio signals are amplified or rejected. The decision concerning which of the audio signals is amplified or rejected is made by using a priority parameter associated with each of the audio signals. The priority parameter can be a value between 0, corresponding to a maximum rejection of the respective audio signal, and 1 corresponding to a maximum amplification of the respective audio signal.

In the modulation step 27, the audio signals can be amplified using gain models. Further, the audio signals might be modulated using frequency translation. For example, high frequency components, which are inaudible for the user, might be translated into lower, audible frequencies. Appropriate gain models and/or frequency models might be incorporated by respective algorithms stored on the data memory 15 and accessed and executed by the computing unit 12 as needed. The algorithms may additionally or alternatively be stored on the external memory 17 and accessed and executed by the computing unit 12 as needed.

The association of the priority parameter takes place asynchronously in relation to further steps of the method, in an asynchronous classification step 28, as will be described below. The asynchronous determination of the priority parameter for each of the separated audio signals has the advantage that the modulation in the modulation step 27 takes place without delay. The audio signals separated in the separation step 24 can therefore supposedly be modulated without delay on the basis of the respective priority parameter. The modulated audio signals are combined into an output signal 0 in an output step 29 and output by using the output interface 14 of the signal processing unit 4. In the exemplary embodiment depicted, this means that the output signal 0 is transferred to the Bluetooth antenna 9 of the mobile phone 5 by using the output interface 14 and is transmitted from said mobile phone to the hearing devices 2, 3. The hearing devices 2, 3 play back the output signal 0 by using the loudspeakers 7. In order to generate a stereo signal, the output signal 0 contains two channels that form a stereo signal applicable on the basis of the sound source directions determined in the conventional conditioning 23. In the playback step 30, the channels that the output signal 0 contains are played back by using the applicable loudspeakers 7 and are audible to the user.

In other exemplary embodiments, the output signal 0 is output as a mono signal having only one channel This output signal is particularly efficient and practical.

The association of the priority parameter is described below in exemplary fashion. The association of the priority parameter takes place in the asynchronous classification step 28. The priority parameter is ascertained on the basis of user-specific stipulations, further user-specific data and/or a comparison against already known audio signals. This can involve for example a sensor reading step 31 being used to ascertain sensor data of the sensors 20 of the mobile phone 5. Moreover, a user input reading step 32 can be used to read user inputs via the user interface 18. A data comparison step 33 can be used to compare data ascertained via the audio signals against information about known audio signals that is already stored in the internal data memory 15 and/or the external memory 17.

In the situation depicted in FIG. 2, the determination of the priority parameters associated with the individual audio signals would take on the following form, for example:

The user of the hearing device system 1 is already in an active conversation with the interlocutor A, for example. In the asynchronous classification step 28, the associated audio signal a is detected as spoken voice and can be compared against an already known voice pattern that is typical of the interlocutor A and saved in the data memory 15. The audio signal a is identified as being associated with the interlocutor and is categorized as important on the basis of its relevance to the user of the hearing device system 1. The audio signal a is therefore assigned a high priority parameter. The audio signals b1, b2 associated with the two passers-by B1, B2 are also detected as spoken voice during the asynchronous classification step 28. However, the passers-by B1, B2 are not known to the user of the hearing device system 1. A comparison against known voice patterns stored in the data memory 15 fails. Subsequently, the audio signals b1, b2 are assigned a low priority parameter, so that these audio signals are rejected. If one of the two passers-by engages in the conversation with the user of a hearing device 1, however, the audio signal thereof can be reevaluated. This can take place automatically, for example, by virtue of the participation in a conversation being detected. This can involve the signal processing device 4 evaluating signal words such as for example "hello" or "sorry" and/or pauses in speech. Moreover, a transcribe of the detected voice signals can be created and have its content evaluated. The signal processing device 4 is capable of learning and automatically customise itself to the means of the user. Additionally, the user of the hearing device system can also use an input on the mobile phone 5, which input is read in the user input reading step 32, to assign a higher priority parameter to the respective passer-by. This can take place by virtue of the individual separated audio signals being displayed to the user on a display of the mobile phone, for example. The user can then select the respective audio signals to be handled in preference by means of touch inputs. The user input can overwrite the automatic customization of the system. The voice pattern of the applicable passer-by can then be saved in the data memory 15 as a known audio source in the data comparison step 33.

The audio signal c of the car C is detected as a motor vehicle moving close to the user of the hearing device system 1. Depending on what further data about the location and/or the movement of the user are ascertained by using the sensor reading step 31, the priority parameter associated with the audio signal c can vary. If the result of the location test and the pattern of movement is for example that the user sits in a pavement café, the audio signal c of the car C is of no kind of significance to the user as a rule. It is therefore assigned a low priority parameter. If the user moves in road traffic, however, the auditive detection of the moving vehicle is relevant to safe participation in the road traffic. In this case, the audio signal c is assigned a higher priority parameter, so that the user can detect the approaching motor vehicle.

The situation is different for the helicopter B. The audio signal d thereof is as a rule irrelevant to the safety of participation in the road traffic. The audio signal d is therefore assigned a low priority parameter in the asynchronous classification step 28. However, the user can cause customisation of the priority parameter by means of appropriate user inputs in this case too.

The identification of the audio signals in the asynchronous classification step 28 is not just used for simulating the priority parameter of the individual audio signals. The information about the audio signals that is obtained in the asynchronous classification step 28 is also used to improve the conditioning of said audio signals in the preparation step 22 and the separation of said audio signals in the separation step 24. To this end, the asynchronous classification step 28 is coupled to the preparation step 22 via a conditioning feedback loop 34. The conditioning feedback loop 34 is used to transfer information obtained in the asynchronous classification step 28 to the preparation step 22 for subsequently detected input signals. This information relates to the surroundings of the user of the hearing device system 1 and to the number and quality of the previously separated audio signals. On the basis of this information, the conventional conditioning 23 can be customized, for example by virtue of the normalization of the input signal being customized to the number of audio signals.

A separation feedback loop 35 is used to transmit the information ascertained in the asynchronous classification step 28 for the audio signals to the separation step 24 for subsequently recorded input signals E. As already mentioned above, the second neural networks 11 used for the separation step 24 are replaceable. This means a multiplicity of differently configured or differently specializing second neural networks 11 can be used in the separation step 24. Each of the different available second neural networks 11 is customized to different types of audio signals. The information transmitted via the separation feedback loop 35 can be used in a network selection step 36 to make a selection for the second neural networks 11 to be used for the separation step 24. The network selection step 36 can be used to replace all or some of the second neural networks used for the separation step 24. Moreover, the number of second neural networks 11 used can be varied. The separation feedback loop 35 can be used to transmit for example the number of audio signals remaining after the merging step 26 to the preparation step 24. Since each of the different second neural networks 11 outputs a fixed number of outputs, i.e. a fixed number of individual audio signals, the information about the number of networks can be used to customise the number of second neural networks 11 used for the separation step 24. By way of example, it is possible for further sound sources, for example trams or further passers-by, to contribute to the input signal, which can necessitate an increase in the number of second neural networks 11 used for the separation step 24. Moreover, the network selection step 36 can be used to customise the number of second neural networks 11 used for separating the audio signals to parameters of the mobile phone 5. If for example the storage battery state of charge of said mobile phone falls below a predetermined limit value, the number of second neural networks 11 can be decreased in order to perform energy-saving separation. If the user is in the situation with many different audio signals, however, and wishes to have the most accurate separation possible, he can reverse the reduction made in the number of second neural networks 11 by means of an appropriate input on the mobile phone 5. In the network selection step 36, the number of second neural networks 11 used can also be customized to the respective available computing power. By way of example, the computing unit 12 on the mobile phone 5 may be occupied by other computing operations, so that the number of second neural networks 11 is reduced. This ensures that the signal processing device does not limit use of the mobile phone 5 by the user for other purposes.

Moreover, the asynchronous classification step 28 can also be used to check the quality of the separation and a customized selection of the second neural networks 11 by means of the separation feedback loop 35 to the ascertained quality. To ascertain the quality, the volume of individual instances of the separation audio signals can be measured over a longer period. This can be effected by using the Root Mean Square (also called RMS) and/or by means of other characteristics, such as for example the maximum volume of the audio signal.

In addition, the second neural networks 11 can be selected on the basis of the classification of the audio signals in the asynchronous classification step 28. There is therefore the assurance that the second neural network 11 with the optimum customisation to the respective audio signals is respectively used for the separation of audio signals of subsequent input signals. In the exemplary embodiment depicted in FIG. 2, it is for example possible for the user of the hearing device system 1 to enter a railway station. When this is detected, for example on the basis of the evaluation of GPS data, the second neural network 11 specializing in road traffic can be replaced with a second neural network 11 specializing in railway station sounds. The second neutral network 11 specializing in railway station sounds can be used for example to reject the audio signals of arriving trains, whereas railway station announcements, for example relating to the delay to a train, are amplified.

The conditioning feedback route 34 and the separation feedback route 35 ensure that the signal processing device is customized to the respective sound scape and surroundings of the user of the hearing device system 1. The signal processing installation is adaptive.

The classification of the audio signals in the asynchronous classification step 28, in particular the comparison thereof against further sensor data and/or against information stored in the data memory 15, takes place asynchronously in relation to the further steps of the method. This ensures that the separation of the audio signals in the separation step 24 and the modulation of the audio signals in the modulation step take place in real time, whereas the classification in the asynchronous classification step 28 takes place over a certain period depending on the complexity of the audio signals and of the further data. By way of example, comparison of a voice pattern of a speaker against stored voice patterns first of all requires a certain sequence of the voice signal to be recorded and analysed. The customisation of the priority parameters and of the preparation step 22 and of the separation step 24 then takes place in steps. The frequency of the customisation can be dependent on the hardware components of the mobile phone 5 and/or on the circumstances relating to the surroundings. As such, for example customisation of the priority parameters in road traffic, in which the sound scape can change often, is necessary at a substantially higher rate than for example when watching television. The customisation can take place up to once every 5 milliseconds. The customisation takes place no more seldomly than once every 10 minutes. Between these limit parameters, the customisation rate can be varied dynamically.

In the exemplary embodiment described, the priority parameters for each audio signal are ascertained continuously. A continuous assessment of the relevance of the individual audio signals on the basis of the respective circumstances is therefore possible. In other exemplary embodiments, the priority parameter can also allow categorization of the individual audio signals into different discrete classes.

In the exemplary embodiment, the respective second neural networks 11 each have a specific number of outputs. For each output, an audio signal separated from the input signal E is output. As such, for example the second neural network 11 depicted at the bottom in FIG. 4, which specializes in the separation, also outputs the voice signal b1 of the passer-by B1. In other exemplary embodiments, the second neural networks are trained such that they each output only audio signals of the type in which they specialize. In the situation depicted in exemplary fashion in FIG. 2, a second neural network specializing in traffic noise would output not the voice signal b1 but rather only the audio signals d, c of the helicopter D and the car C. The unassigned, excess third output would then output a blank signal, corresponding to an audio signal that contains no sound, or silence. The number of blank signals generated by the second neural networks used for separation is used by the signal processing device as a measure of the number of audio signals that the input signal contains. If the signal processing device detects that many outputs of the second neural networks used for separation contain blank signals, the number of second neural networks used for separation can be reduced. As such, it is possible, by way of example, for the user of the hearing device system to enter a house from the street. The second neural network used for detecting traffic noise would then output only blank signals and could be deactivated. This allows an efficient and power-saving separation of the audio signals.

In yet other exemplary embodiments, an output from each second neural network contains a remainder signal containing the input signal minus the audio signals separated by using the respective second neural network. The remainder signal thus corresponds in each case to the sum of all audio signals not separated from the input signal by using the respective second neural network. In the situation depicted in exemplary fashion in FIG. 2, a second neural network specializing in traffic noise would therefore output the audio signals c, d of the car C and the helicopter D. The remainder signal would then comprise the voice signals a, b1, b2 of the interlocutor A and the passers-by B1, B2. The respective remainder signals are used by the signal processing device as a measure of unseparated audio signals. If the remainder signals still comprise a large number of items of information, the signal processing device increases the number of second neural networks, as a result of which a larger number of audio signals is separated from the input signal. The increase in the number of second neural networks used can be prevented in this case too by the detection of further system parameters, such as for example a low storage battery state.

FIG. 5 schematically shows a further embodiment of a system for processing audio signals in the form of a hearing device system 1a. Components that have already been described above referring to the FIGS. 1 to 4 have the same reference numbers and will not be discussed in further detail.

The hearing device system 1a comprises two hearing devices 2a, 3a as well as the signal processing device 4. The function of the hearing devices 2a, 3a and the signal processing device 4 is the same as described in respect to FIGS. 1 to 4. The hearing devices 2a, 3a each comprise classical audio processing means 40. The classical audio processing means 40 comprise a digital signal processor (DSP) and/or blind-source separation routines. The classical audio processing means 40 can process audio signal using classical methods known in the art of hearing devices. In normal use, e.g. in use as described with respect to FIGS. 2 to 4, the classical audio processing means 40 are deactivated and the input signal E is processed by the signal processing device 4 using the neural networks 10, 11.

The classical audio processing means 40 can be activated to replace the audio signal processing by the signal processing device 4. In this case, the input signal E, which is recorded by the microphones 6 of the hearing devices 2a, 3a, is processed by the respective classical audio processing means 40. The output signal 0, which is played back by the loud speakers 7, is computed by the classical audio processing means 40 directly on the hearing devices 2a, 3a.

The classical audio processing means 40 can for example replace the audio signal processing by the signal processing device 4, when the signal processing device 4 is switched off or otherwise not in data connection with the hearing devices 2a, 3a. The user can rely on the hearing device system 1a even in cases when he does not carry the mobile device 5, when the mobile device 5 is switched off, when its battery is depleted or when the mobile device 5 is otherwise not available for audio signal processing. The classical audio processing means 40 provide a fallback option for reliable audio signal processing.

It is further possible, that the classical audio processing means 40 are temporarily used instead of the neural networks 10, 11. This may in particular be useful in situations in which the high quality of the signal processing by the neural network is not required to obtain sufficient results. For example, when the user is in quiet surroundings with only a few sound sources, classical audio processing might be sufficient. Using the classical audio processing means 40 allows to reduce the power consumption of the signal processing device. Switching between audio signal processing by the classical audio processing means 40 or by the neural networks 10, 11 might be performed automatically, e.g. based on an analysis of the input signal and/or a classification of the audio signals in the asynchronous classification step 28. It is also possible that the user can switch between classical audio processing and audio processing by the neural networks 10, 11 on demand.

In further exemplary embodiments, the signal processing device comprises at least one classical audio processing means. For example, the classical audio processing means might be incorporated in a computing unit of the signal processing device, e.g. in form of a digital signal processor (DSP) and/or blind-source separation routines. In these embodiments, the signal processing device can switch from audio signal processing with the neural networks to classical audio signal processing. Switching to classical audio signal processing may be performed in order to temporarily reduce computational needs and energy consumption of the signal processing. In some embodiments, the at least one hearing device and the signal processing device each comprise at least one classical audio processing means.

In yet another exemplary embodiment, the mobile device 5 comprising the signal processing device 4 is a wireless microphone. The wireless microphone can be used to record at least parts of the input signal. A transfer of the input signal from the hearing devices 2, 3 to the signal processing device is not necessary, which improves latency. The wireless microphone can be placed by the user of the hearing device system in order to record specific sounds. For example, it can be placed on a table between the user and one or more conversation partners.

The invention claimed is:

1. A signal processing device for processing audio signals, having:
    an input interface for receiving an input signal,
    at least one first neural network for conditioning the input signal,
    at least one second neural network for separating one or more audio signals from the conditioned input signal, and
    an output interface for outputting an output signal, wherein the output signal comprises the one or more audio signals separated from the conditioned input signal,
    wherein for the processing of the input signal the at least one first neural network and the at least one second neural network are arranged sequentially.

2. The signal processing device according to claim 1, characterized by a plurality of second neural networks, wherein each of the second neural networks is customized to a specific type of audio signals.

3. The signal processing device according to claim 1, characterized in that at least two second neural networks are used in parallel for the separation of the audio signals from the input signal.

4. The signal processing device according to claim 1, characterized in that the at least one second neural network used for separating the one or more audio signals is selectable from a plurality of second neural networks specializing in different types of audio signals.

5. The signal processing device according to claim 1, characterized in that the at least one first neural network and the at least one second neural network are part of a joint neural network.

6. The signal processing device according to claim 1, characterized by a user interface for receiving user inputs and/or for outputting information to a user.

7. The signal processing device according to claim 1, characterized by at least one data memory for storing known types of audio signals.

8. A system for processing audio signals, having:
   at least one signal processing device for processing audio signals according to claim 1,
   at least one recording device for recording the input signal, wherein the recording device is connected to the signal processing device via the input interface in a data-transmitting manner, and
   at least one playback device for playing back an output signal, wherein the playback device is connected to the signal processing device via the output interface in a data-transmitting manner.

9. The system according to claim 8, characterized by being a hearing device system.

10. The system according to claim 8, characterized in that the at least one signal processing device is in the form of a mobile phone, part of a mobile phone or a wireless microphone.

11. The system according to claim 8, characterized by a modular design.

12. A method for processing audio signals, having the steps of:
   providing a signal processing device according to claim 1,
   providing the input signal,
   supplying the input signal to the signal processing device via the input interface,
   conditioning the input signal by using the at least one first neural network,
   separating one or more audio signals from the conditioned input signal by using the at least one second neural network,
   determining a priority parameter for each of the audio signals,
   modulating each audio signal on the basis of the respective priority parameter,
   combining the audio signals to produce an output signal,
   outputting the output signal via the output interface.

13. The method according to claim 12, characterized in that the separated audio signals are classified.

14. The method according to claim 12, characterized in that a selection of the at least one second neural network from an available set of different second neural networks is made on the basis of user-specific data and/or already separated audio signals.

15. The method according to claim 12, characterized in that the determination of the priority parameters takes place asynchronously in relation to the further steps of the method.

16. The method according to claim 12, characterized in that the determination of the priority parameters takes place on the basis of user-specific data, preferences of the user and/or an information content of the respective audio signal.

17. The method according to claim 12, characterized in that the conditioning of the input signal and/or the separation of one or more audio signals from the conditioned input signal comprises one or more steps of classical audio processing.

18. The method according to claim 12, characterized in that the one or more audio signals separated from the input signal are enhanced.

19. The method according to claim 12, characterized in that the one or more audio signals separated from the input signal are denoised.

20. The method according to claim 12, characterized in that modulation of the one or more audio signals comprises amplification and/or frequency translation of at least parts of the one or more audio signal.

\* \* \* \* \*